(12) United States Patent
Allen et al.

(10) Patent No.: US 12,354,352 B2
(45) Date of Patent: *Jul. 8, 2025

(54) ALTERING FUNCTIONALITY OF A VIDEO CONFERENCE COMPONENT

(71) Applicant: Zoom Communications, Inc., San Jose, CA (US)

(72) Inventors: Reed Hunter Allen, Medford, OR (US); Shane Paul Springer, Oregon City, OR (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/420,124

(22) Filed: Jan. 23, 2024

(65) Prior Publication Data

US 2024/0161499 A1     May 16, 2024

Related U.S. Application Data

(63) Continuation of application No. 17/951,292, filed on Sep. 23, 2022, now Pat. No. 11,915,483.

(51) Int. Cl.
| | |
|---|---|
| *H04N 7/14* | (2006.01) |
| *G06V 20/40* | (2022.01) |
| *H04L 65/403* | (2022.01) |
| *H04N 5/445* | (2011.01) |
| *H04N 7/15* | (2006.01) |

(52) U.S. Cl.
CPC ............ *G06V 20/41* (2022.01); *H04L 65/403* (2013.01); *H04N 5/445* (2013.01); *H04N 7/14* (2013.01); *H04N 7/15* (2013.01)

(58) Field of Classification Search
CPC ...... G06V 20/41; H04L 65/403; H04N 5/445; H04N 7/14; H04N 7/15
USPC ....................................................... 348/14.01
See application file for complete search history.

(56) References Cited

U.S. PATENT DOCUMENTS

| | | | |
|---|---|---|---|
| 6,894,714 B2 | 5/2005 | Gutta et al. | |
| 8,253,770 B2 | 8/2012 | Kurtz et al. | |
| 8,447,020 B2 | 5/2013 | Bychkov et al. | |
| 9,088,694 B2 | 7/2015 | Navon et al. | |
| 9,357,165 B2 | 5/2016 | Lu et al. | |
| 9,536,197 B1 | 1/2017 | Penilla et al. | |
| 9,712,785 B2 | 7/2017 | Sandvik et al. | |
| 10,187,579 B1 | 1/2019 | Wang et al. | |
| 10,334,208 B2 | 6/2019 | Pan et al. | |
| 10,939,045 B2 | 3/2021 | Wang et al. | |
| 11,029,838 B2 | 6/2021 | LeMay et al. | |
| 11,350,029 B1 | 5/2022 | Ostap et al. | |

(Continued)

*Primary Examiner* — Trang U Tran
(74) *Attorney, Agent, or Firm* — Young Basile Hanlon & MacFarlane, P.C.

(57) ABSTRACT

A computer determines one or more configurations specific to a first participant of a video conference for altering functionality of one or more components of the video conference. The computer applies the one or more configurations during the video conference. The computer determines one or more preferences of a second participant of the video conference associated with the one or more components. The computer determines at least one additional configuration of the video conference based on at least one of one or more prioritizations of the first participant or one or more prioritizations of the second participant.

20 Claims, 10 Drawing Sheets

(56) References Cited

U.S. PATENT DOCUMENTS

| | | |
|---|---|---|
| 2006/0259755 A1 | 11/2006 | Kenoyer |
| 2017/0104961 A1* | 4/2017 | Pan ..................... H04N 7/147 |
| 2018/0063479 A1 | 3/2018 | Nimri et al. |
| 2018/0204576 A1 | 7/2018 | Dhoot et al. |
| 2023/0239330 A1 | 7/2023 | Chan et al. |
| 2024/0097925 A1* | 3/2024 | Palamadai ............ H04N 7/152 |

* cited by examiner

PRIORITIZATION MATRIX

|  | Function 1 | Function 2 | Function 3 | Function 4 | Function 5 | Function 6 | Function 7 | Function 8 |
|---|---|---|---|---|---|---|---|---|
| Participant 1 | H | L | L | M | H | L | L | L |
| Participant 2 | M | H | M | L | L | L | L | L |
| Participant 3 | H | L | M | L | L | L | L | L |
| Participant 4 | M | M | M | H | L | L | L | M |
| Participant 5 | M | M | M | M | M | M | M | M |

ALTERING FUNCTIONALITY OF A VIDEO CONFERENCE COMPONENT

CROSS-REFERENCE TO RELATED APPLICATION(S)

This application is a continuation of U.S. patent application Ser. No. 17/951,292, filed Sep. 23, 2022, the entire disclosure of which is hereby incorporated by reference.

FIELD

This disclosure relates generally to video conferencing and, more specifically, to applying a configuration for altering functionality of a component available for use during a video conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 7 is an example of a prioritization matrix for determining a configuration for altering functionality of a component.

DETAILED DESCRIPTION

Figure 1:
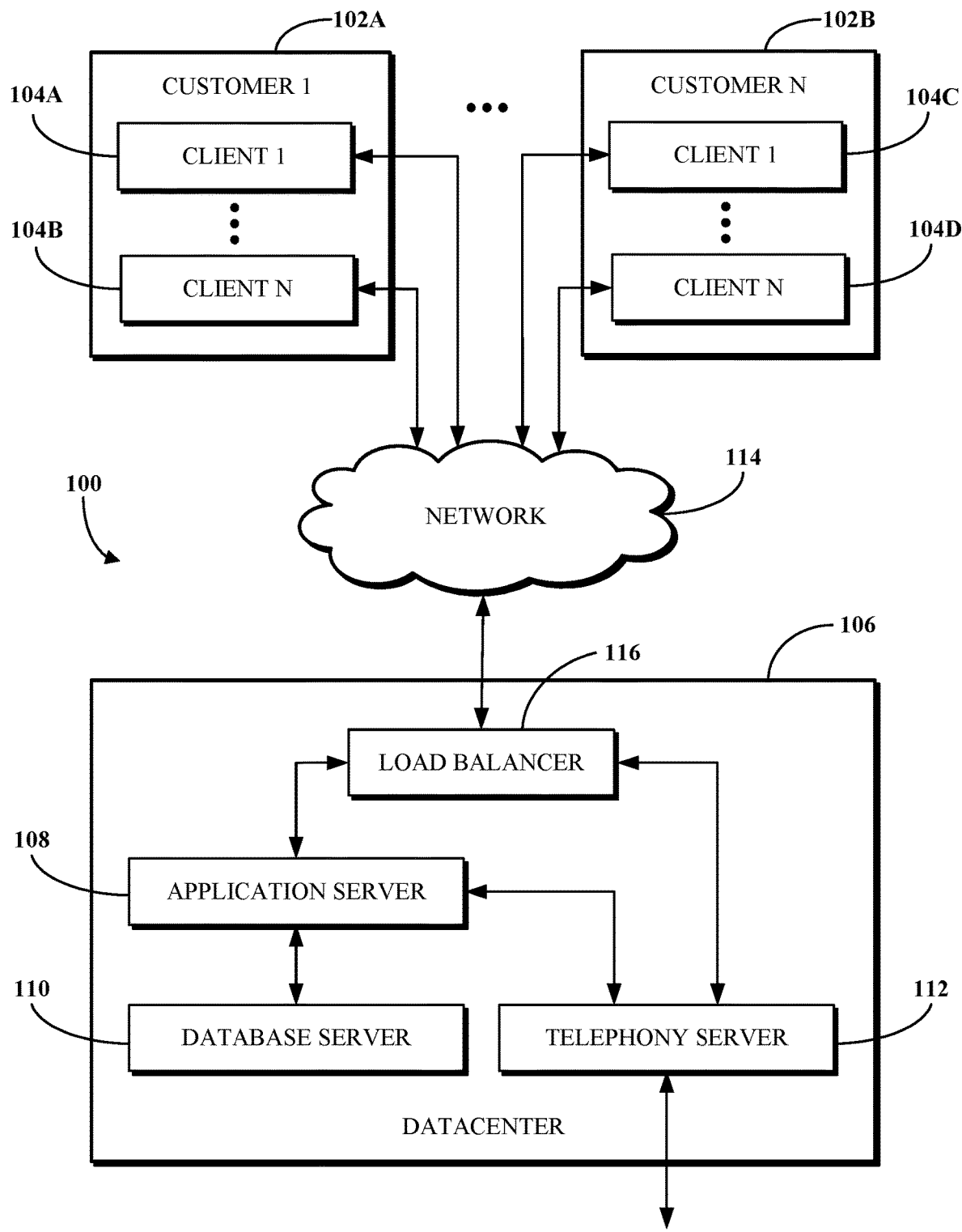
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

Conventional video conferencing software, such as that implemented by a UCaaS or other software platform, generally presents a consistent interface for all participants. This enables the participants to receive experiences that are similar to one another and similar between different video conferencing sessions. However, some participants may prefer to customize their experience away from the typical interface during a particular video conference. For example, some participants may prefer a particular angle of the camera, gain of the microphone, or volume of the speaker, or may prefer using a particular feature of the video conferencing software, such as for recording the conference, sharing a digital whiteboard, or communicating via chat. While these preferences may be enabled by accessing various settings, it may be cumbersome for the participants to do so and/or may be disruptive to the conferencing process, particularly when many participants of a video conference are interested in customizing their own experiences. For example, in the beginning of a video conference, some participants may be adjusting their cameras, microphones, or speakers, while other participants may be looking for recording, sharing, or chat options in the GUI. This may cause distractions which result in an inefficient use of time during the conference. Further, some participants may not realize how their experience could benefit from customizations. For example, when a new feature of the video conferencing software is released, or when a customization becomes popular with other users in the participant's group, department, or organization, or in the participant's geographic region, the participant may not know about the feature or the customization. This may result in a lost opportunity for the participant to improve their experience.

Implementations of this disclosure address problems such as these by determining and automatically applying user-specific configurations for customizing a user experience with a video conference so that participants do not lose time by manually configuring their own settings and/or lose opportunities by missing features or customizations. A system may implement a server-side or client-side approach for the feature. The system, which may include a device executing configuration software, may detect a participant of a video conference, such as by using facial recognition, voice detection, beaconing from a device used by the participant, IP address information or location information of a device used by the participant, login information associated with the participant, or calendar information associated with the participant. The detection may include identifying the participant as a particular person, or as a person belonging to a particular group, department or organization, and/or as a person in a particular geographic region (e.g., the device may execute the configuration software to determine identification information associated with the participant). For example, the device may execute the configuration software to identify the participant based on the facial recognition, the voice detection, the beaconing, the login information, or the calendar information.

The device may then execute the configuration software to determine one or more configurations specific to the detected participant for altering the functionality of one or more components available for use by the participant during the video conference. The one or more configurations may be determined, for example, based on one or more preferences of the participant and a priority associated with the functionality of the one or more components. The device may then execute the configuration software to determine the preferences based on the identification information. In some cases, the preferences may be determined by accessing a record (e.g., a lookup table) that includes predetermined preferences of the participant for configuring the one or more components. In some cases, the preferences may be determined by using a machine learning model, trained using past settings to configure the one or more components during one or more past video conferences attended by the participant, to predict the preferences for configuring the one or more components. The components could include, for example, hardware components, such as cameras, microphones, speakers, lights, and actuators, and/or software components, such as a GUI of video conferencing software used to implement the subject video conference (e.g., a client-side GUI output within a client application at a display used by the participant). In such cases, the preferences could include, for example, a particular angle, focus, or zoom of the camera, gain or mute of the microphone, or volume of the speaker, or a particular feature of the video conferencing software being exposed via the GUI (e.g., a button), such as recording the meeting, sharing a digital whiteboard, or communicating via chat. The device may also execute the configuration software to determine the priority based on the identification information. The priority may indicate a relative ranking or importance of the functionality to the particular person, or the particular group, department or organization, and/or in the particular geographic region. For example, the priority may be low for recording the meeting, but high for sharing a digital whiteboard, and high for communicating via chat. The priority may be determined based on the participant's use of the software platform, by settings applied by other users in the participant's group, department, or organization, or in the participant's particular geographic region, or a timing associated with the availability of features of the video conferencing software (e.g., a date of initial release or change).

The device may thereafter execute the configuration software to apply the one or more configurations, during the video conference, based on the one or more preferences of the participant and the priority associated with the functionality. As a result, a participant's experience during a video conference may be improved, including to enable a more efficient use of time during the video conference by reducing distractions for the participants and/or presenting improvements.

To describe some implementations in greater detail, reference is first made to examples of hardware and software structures used to implement a system for applying a configuration for altering functionality of a component available for use during a video conference. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one of the clients 104A through 104D or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, an SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, an SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106. For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
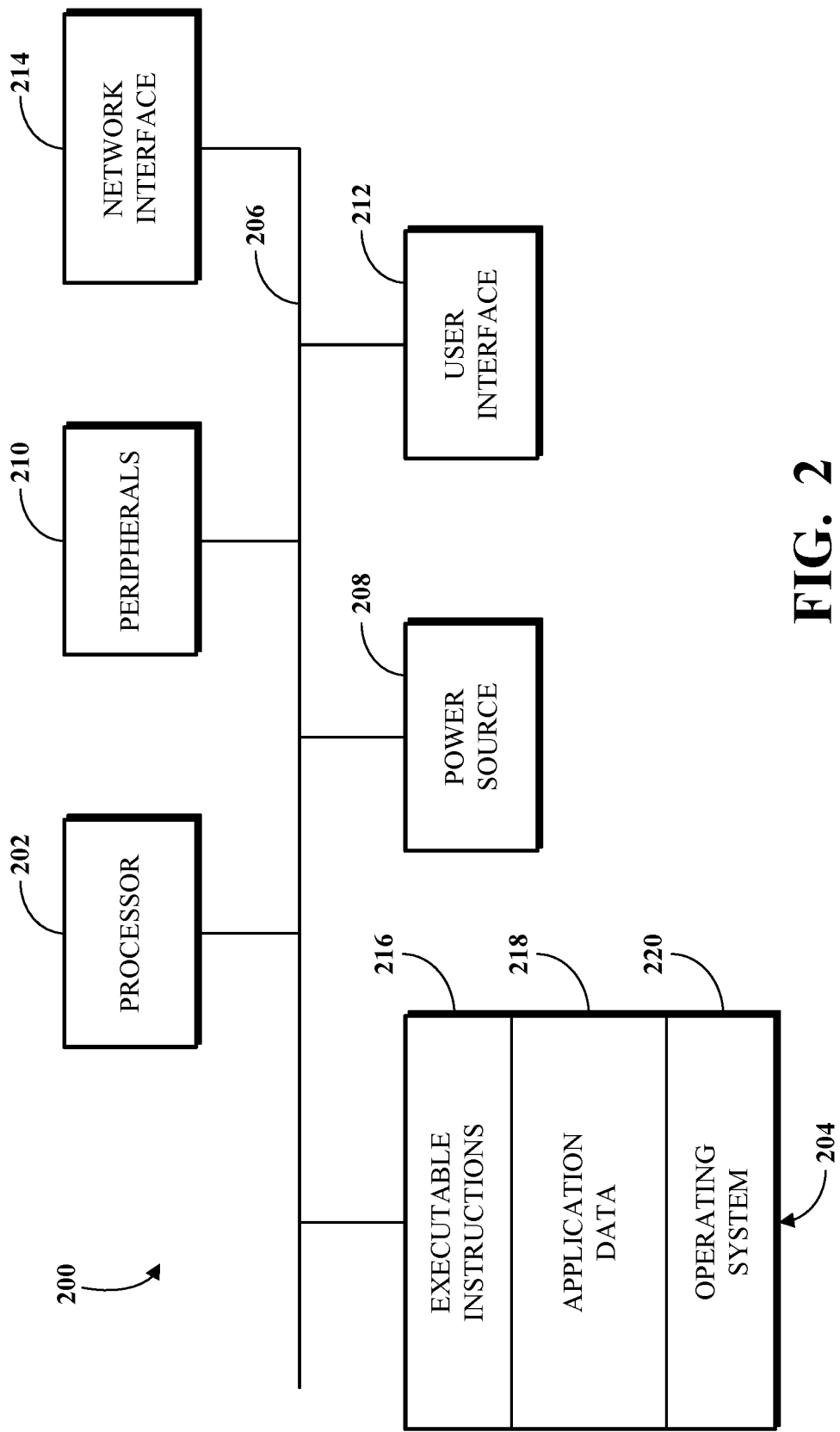
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR DRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, virtual reality display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
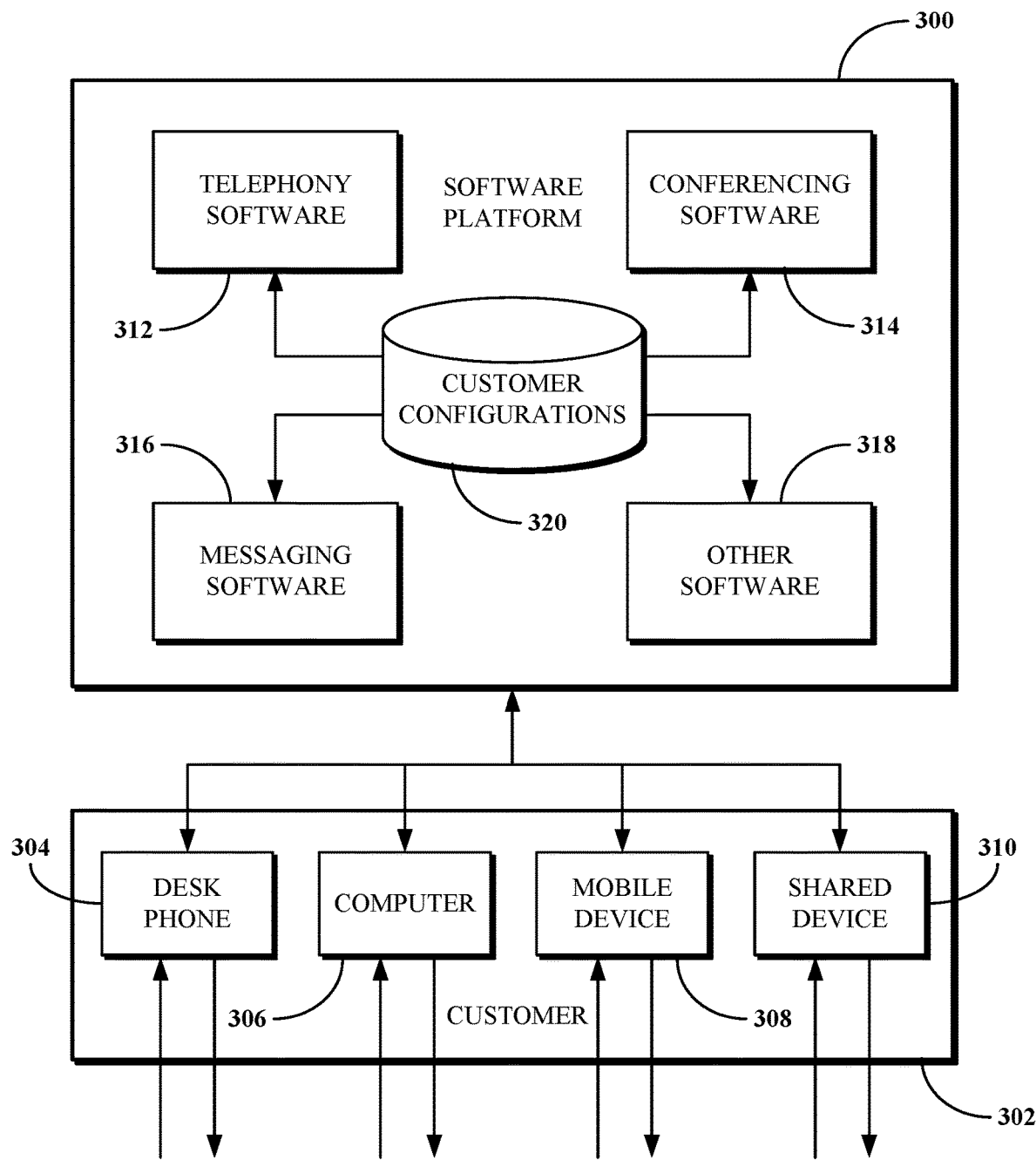
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for applying a configuration for altering functionality of a component available for use during a video conference. In some such cases, the conferencing software 314 may include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some, or all, of the software 312 through 318 may be combined into a single software application run on clients of the customer, such as one or more of the clients 304 through 310.

Figure 4:
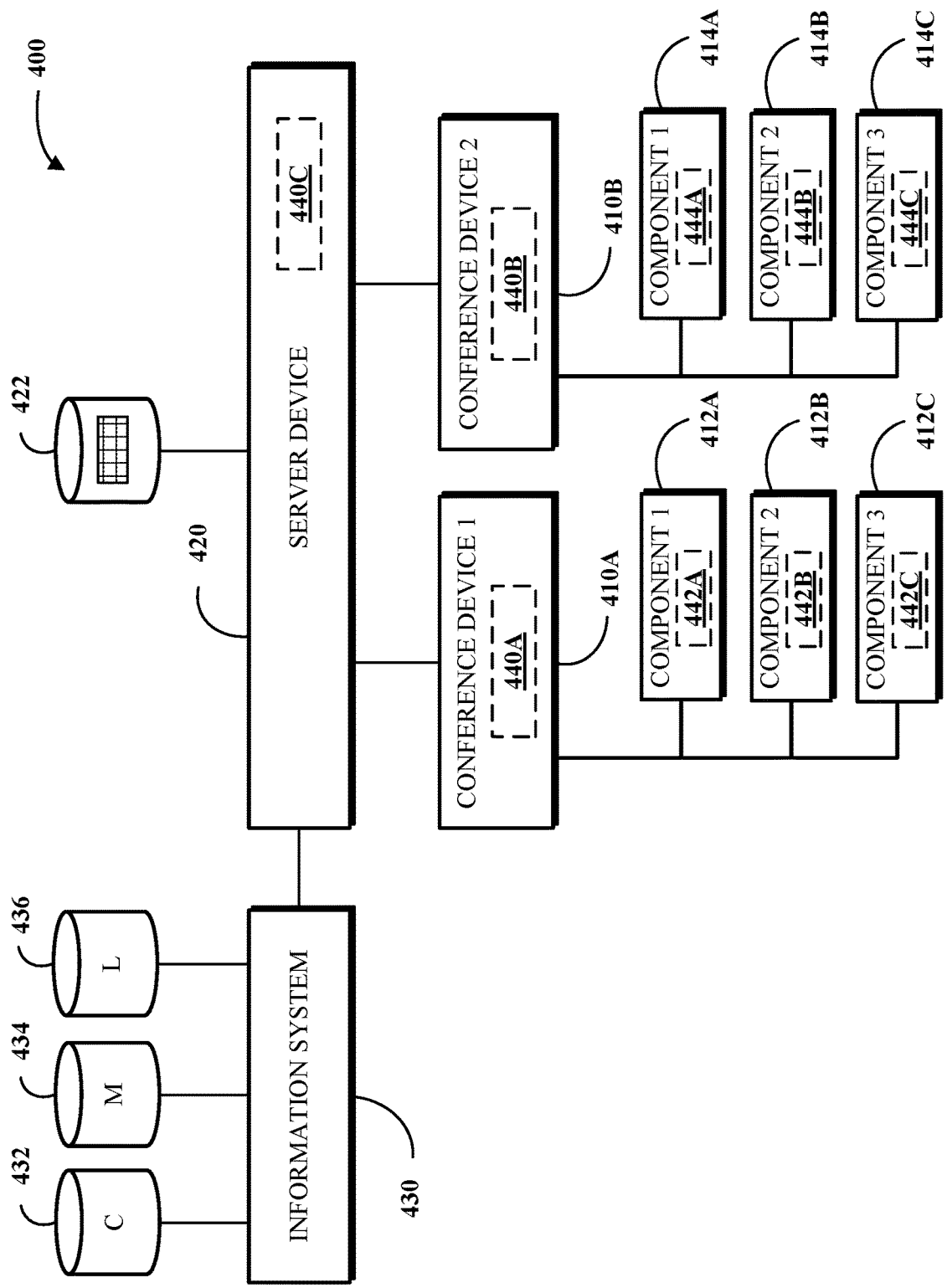
FIG. 4 is a block diagram of an example of a system for applying a configuration for altering functionality of a component available for use during a video conference.

FIG. 4 is a block diagram 600 of an example of a system 400 for applying a configuration for altering functionality of a component available for use during a video conference. The system 400 may include one or more conference devices that can be used by participants, such as conference devices 410A and 410B. The conference device 410A and/or the conference device 410B could, for example, be a client device such as one of the clients 104A through 104D shown in FIG. 1, or the clients 304 through 310 shown in FIG. 3. Thus, a conference device of the system 400, such as the conference device 410A or the conference device 410B, may be a processing system that includes at least a processor and a memory. Such a conference device could be operated by one or more users in a physical space (e.g., a classroom, a conference room, or other meeting room), and in some cases may be shared with other participants of other conferences at different times. The conference devices 410A and 410B may execute software (e.g., client-side conferencing software, which could, for example, be via a client application or a web application used to connect to a conference implemented using server-side software, such as the conferencing software 314 shown in FIG. 3) to connect to a server device 420. The server device 420 may execute software (e.g., server-side conferencing software, such as the conferencing software 314) to support a video conference between participants using the conference devices 410A and 410B. For example, the server device 420 could be a server at the datacenter 106 shown in FIG. 1. Thus, the server device 420 may also be a processing system that includes at least a processor and a memory. Although two conference devices 410A and 410B are shown and described by example, other numbers of conference devices may be used with the system 400.

During a video conference, a participant may use various hardware and software components associated with a conference device (e.g., the conference device 410A or 410B) to participate in the conference. For example, a participant using conference device 410A may use one or more of the components 412A through 412C associated with the conference device 410A, and a participant using conference device 410B may use one or more of the components 414A through 414C associated with the conference device 410B. Although three components 412A through 412C are shown and described with respect to the conference device 410A by example and three components 414A through 414C are shown and described with respect to the conference device 410B by example, other numbers of components may be used with or otherwise available for use with a conference device of the system 400. The components may be provided in a physical space, such as the components 412A through 412C in a first physical space with the conference device 410A, and the components 414A through 414C in a second physical space with the conference device 410B. In some cases, the components, as with the conference devices, may be shared with other participants of other conferences at different times. For example, the components may be provided in a classroom, a conference room, or other meeting room and may be shared with other participants using the classroom, the conference room, or other meeting room at different times.

Each of the components 412A through 412C and 414A through 414C may be or otherwise include one or more hardware components (e.g., cameras, microphones, speakers, lights, actuators, input interfaces, output interfaces, digital whiteboards, and/or computers) and/or one or more software components (e.g., video conferencing software, a GUI implemented by video conferencing software, software or firmware controlling the functionality of hardware, and/or user settings). In some cases, one or more of the components may also be or otherwise include a personal computing device of a participant, for example, a smart phone, laptop, or tablet. For example, the components 412A through 412C could include one or more personal computing devices of the participants that are brought into a physical space for use during the video conference, which may be connected to other components, such as via Bluetooth pairing or other wireless protocol.

For determining and automatically applying user-specific configurations for customizing a user experience with a video conference, a device (e.g., the conference device 410A, the conference device 410B, or the server device 420) may execute configuration software (e.g., client-side configuration software or server-side configuration software). For example, the conference device 410A could execute configuration software 440A, the conference device 410B could execute configuration software 440B, and the server device 420 could execute configuration software 440C. Each device may execute a separate instance of the configuration software. For example, the configuration software 440A, the configuration software 440B, and the configuration software 440C may be separate instances of the configuration software. The configuration software may enable applying a configuration for altering functionality (e.g., from default functionality) of select components (e.g., one or more of the components 412A through 412C or 414A through 414C) available for use during the video conference. For example, configuration software 440A may enable applying a configuration 442A for altering functionality of component 412A, a configuration 442B for altering functionality of component 412B, and a configuration 442C for altering the functionality of component 412C, and configuration software 440B may enable applying a configuration 444A for altering functionality of component 414A, a configuration 444B for altering functionality of component 414B, and a configuration 444C for altering the functionality of component 414C. In another example, the configuration software 440C may enable applying the configurations 442A to 442C and the configurations 444A to 444C. This may help the participants to improve their experiences, such as by avoiding the need to manually configure their own settings and/or by automatically receiving new features or customizations.

The device may execute the configuration software to detect one or more participants using the one or more conference devices connected to the video conference—in this case, the conference device 410A and the conference device 410B. The device may detect the one or more participants, for example, by using facial recognition, voice detection, beaconing from a device used by the participant, IP address information or location information of a device used by the participant, login information associated with the participant, or calendar information associated with the participant. The detection may include identifying one or more of the participants as a particular person, or a person belonging to a particular group, department or organization, and/or a person in a particular geographic region (e.g., the device may determine identification information associated with the participant). For example, the system may identify "Participant 1" and "Participant 2" as multiple participants using the conference device 410A (e.g., in a same physical space), and may identify "Participant 3" as a single participant using the conference device 410B (e.g., in a different physical space), such as by facial recognition of the various participants.

The device may then execute the configuration software to determine one or more configurations specific to the one or more participants for altering the functionality of the components (e.g., the components 412A through 412C or 414A through 414C). For example, the device may determine one configuration specific to Participants 1 and 2, altering the functionality of the components 412A through 412C in one manner, and may determine another configuration specific to Participant 3, altering the functionality of the components 414A through 414C in another manner. The configurations may be determined based on preferences of the participants and/or priorities associated with the functionality of the components.

The device may determine the preferences and/or priorities based on the identification information. For example, the server device 420 may use a machine learning model and/or records (e.g., lookup tables) stored in a data structure 422 to determine the preferences and/or priorities, such as by obtaining the preferences and/or priorities using a prioritization matrix. The preferences could include, for example, a particular angle, focus, or zoom of the camera, gain or mute of the microphone, or volume of the speaker, or a particular feature of the video conferencing software being exposed via the GUI (e.g., a button), such as recording the meeting, sharing a digital whiteboard, or communicating via chat. A priority may indicate a relative ranking or importance of a functionality to a particular person, or a particular group, department or organization, and/or in a particular geographic region. For example, for Participant 1, the priority may be high for communicating via chat, high for sharing a digital whiteboard, and high for increasing volume of a speaker, but low for recording the meeting, while for Participant 2, the priority may be medium for communicating via chat, medium for sharing a digital whiteboard, and high for recording the meeting, but low for increasing volume of the speaker. Based on a comparative analysis weighted toward higher priority functions of a component, the device may apply a configuration that includes displaying an area in a GUI for communicating via chat, displaying a first button in the GUI for sharing a digital whiteboard, displaying a second button in the GUI for recording the meeting, and increasing volume of the speaker. Thus, the configuration may permit a customized experience for one or more participants (e.g., Participants 1 and 2) during a video conference.

In some implementations, the priority may be determined based on one or more of the participant's use of a software platform (e.g., the software platform 300), settings applied by other users in the participant's group, department, or organization (e.g., for Participants 1 and 2, settings applied by Participant 3), settings applied by other users in the participant's particular geographic region, and/or a timing associated with the availability of features of the video conferencing software (e.g., a date of initial release or change).

In some implementations, the device may use the machine learning model, accessed via the data structure 422, to predict the preferences and/or priorities for determining the configurations. To make the predictions, the machine learning model may be trained using historical information stored in a data structure 422. The historical information may include past settings to configure one or more components during one or more past video conferences attended by a participant (e.g., Participants 1 and/or 2, when training to configure the components 412A through 412C). For example, the machine learning model can be trained using a training data set including data samples representing parameters for settings and/or configurations of the one or more components. The training data set can enable the machine learning model to learn patterns, such as preferred functionality of components by the participant and/or priorities associated with functionality, such as one component being used in a certain way more often than another way and/or more often than another component. The training can be periodic, such as by updating the machine learning model on a discrete time interval basis (e.g., once per week or month), or otherwise. The training data set may derive from multiple participants (e.g., Participants 1, 2, and 3) or may be specific to a particular participant (e.g., Participant 1 or 2). The training data set may omit certain data samples that are determined to be outliers, such as past settings to configure one or more components when a participant is in a particular geographic region falling outside of an established normalization (e.g., due to an occasional travel). The machine learning model may, for example, be or include one or more of a neural network (e.g., a convolutional neural network, recurrent neural network, deep neural network, or other neural network), decision tree, vector machine, Bayesian network, cluster-based system, genetic algorithm, deep learning system separate from a neural network, or other machine learning model.

The device may execute the configuration software to use the machine learning model and/or the records to determine the preferences of the participants and/or the priorities associated with the functionality. The device may apply configurations, during the video conference, based on the preferences and/or priorities. For example, the device may apply the first configuration based on the preferences of Participants 1 and 2 and the priorities associated with the functionality of the components 412A through 412C, and may apply the second configuration based on the preferences of Participant 3 and the priorities associated with the functionality of the components 414A through 414C for Participant 3.

In some implementations, the device, via the configuration software or other software, may communicate with external software running at one or more external servers, such as via an application programming interface (API) call, to obtain information from another software platform (e.g., the software platform 300), such as calendar information, message information, and/or location information. The one or more servers may be implemented by one or more systems that are separate from the device that is executing the meeting software. For example, the server device 420, executing the configuration software, may use an API of an information system 430 to communicate with the information system 430, such as to access calendar information in a data structure 432, message information in a data structure 434, and/or location information in a data structure 436. The device may use the calendar information, the message information, and/or the location information to detect the participants, to determine the preferences and/or priorities, and/or to determine the configurations. As a result, a participant's experience during a video conference may be improved, including by enabling a more efficient use of time during the video conference and/or presenting improvements to the participant.

Figure 5:
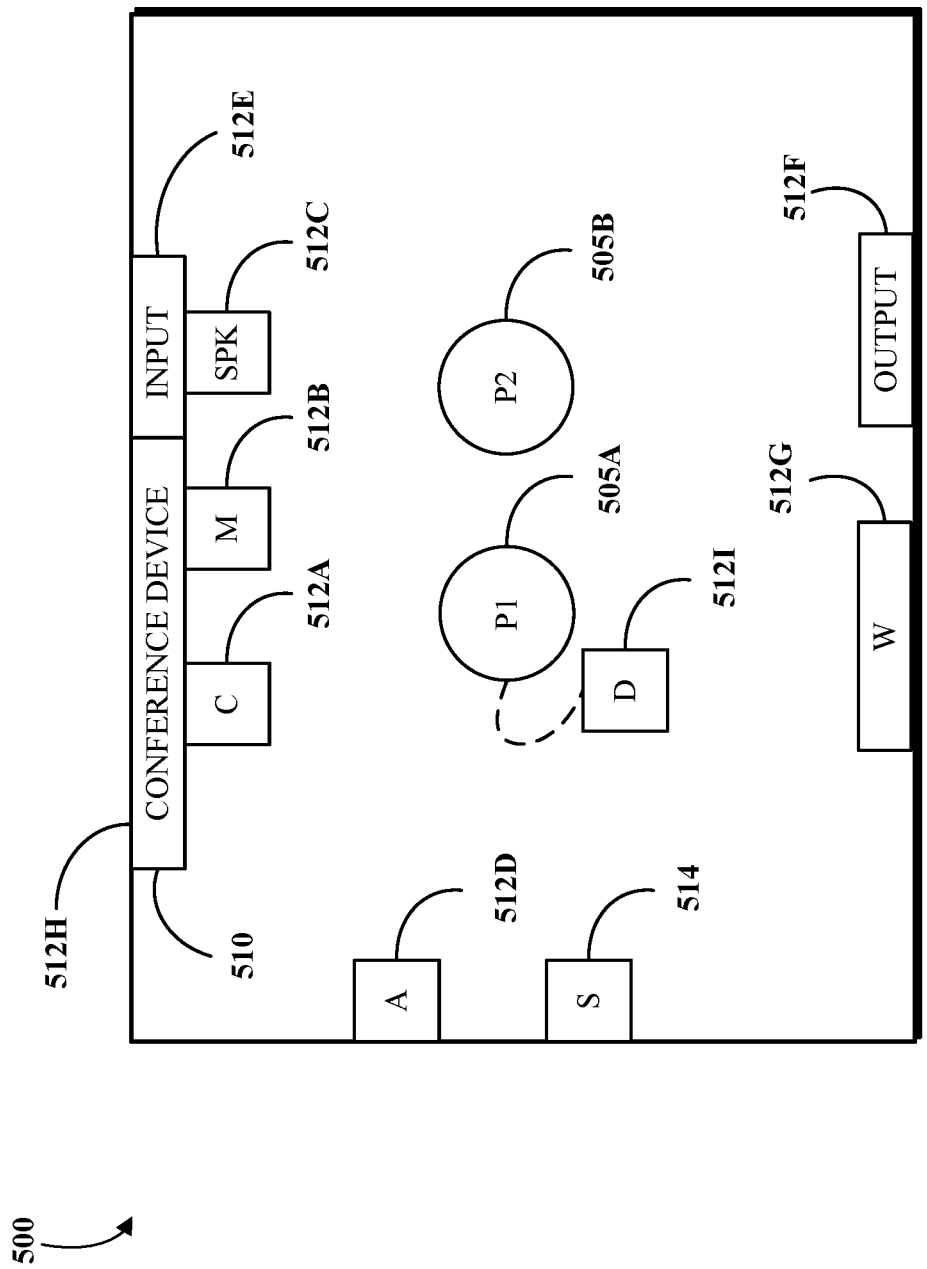
FIG. 5 is a block diagram of an example of a physical space including components available for use during a video conference.

FIG. 5 is a block diagram of an example of a physical space 500 including components available for use during a video conference. The physical space 500 could be a classroom, a conference room, or other meeting room. In the physical space 500, one or more participants, such as participants 505A and 505B, may use a conference device 510. The conference device 510 can execute software, such as client-side conferencing software and client-side configuration software, for participating in a video conference. For example, the conference device 510 could be the conference device 410A executing the configuration software 440A shown in FIG. 4, and the participants 505A and 505B using the conference device 510 could accordingly be the Participants 1 and 2 using the conference device 410A. The participants 505A and 505B may use the conference device 510 to communicate with other participants of the video conference (e.g., Participant 3 using the conference device 410B) during the video conference. For example, the participants 505A and 505B may use the conference device 510 to communicate with a server device like the server device 420 shown in FIG. 4.

The participants (e.g., the participants 505A and 505B) in the physical space 500 may use various components to participate in the conference, such as components 512A through 512I. For example, the components 512A through 512I may be like the components 412A through 412C shown in FIG. 4. The components may include hardware components that are connected to the conference device 510 (e.g., via one or more wired and/or wireless connections) and/or software components that are virtually accessible by software running at the conference device 510. For example, the hardware components may include a camera 512A, a microphone 512B, a speaker 512C, an actuator 512D (e.g., for a lighting system, a curtain system, or an environmental control system), an input interface 512E, an output interface 512F, a digital whiteboard 512G, a computer 512H (e.g., which may implement the conference device 510), and a participant's personal computing device 512I (e.g., a detected smart phone, laptop, or tablet, brought into the physical space 500 by a participant, such as the participant 505A). The hardware components may include control logic to control the functionality of the components and to enable communication with the conference device 510. For example, the actuator 512D may include control logic that controls a lighting system (e.g., controlling one or more lights in the physical space 500 to turn on, off, dim by a percentage, or flash), a curtain system (e.g., controlling one or more shades, curtains, or drapes, to open or close), or an environmental control system (e.g., controlling a heating, ventilation, and air conditioning (HVAC) system to increase or decrease temperature, pressure, or humidity). The control logic may also enable communication between the conference device 510 and the lighting system, the curtain system, or the environmental control system.

The software components may include, for example, video conferencing software (e.g., executing on the conference device 510), a GUI of the video conferencing software, software and/or firmware for controlling the functionality of hardware (e.g., software or firmware controlling the camera 512A, the microphone 512B, the speaker 512C, the actuator 512D, the input interface 512E, the output interface 512F, the digital whiteboard 512G, the computer 512H, or the participant's personal computing device 512I), and/or user settings controlling the functionality of hardware (e.g., user settings for the camera 512A, the microphone 512B, the speaker 512C, the actuator 512D, the input interface 512E, the output interface 512F, the digital whiteboard 512G, the computer 512H, or the participant's personal computing device 512I). The software components may in some cases include one or more software interfaces for communicating with the conference device 510 (e.g., an API).

In some implementations, the physical space 500 may include one or more sensors configured for monitoring the physical space 500, such as a sensor 514. For example, the sensor 514 could be one of the peripherals 210 shown in FIG. 2. The sensor may be configured to provide sensed information in the physical space 500, such as data indicating environmental conditions (e.g., temperature, pressure, humidity, ambient light, and/or carbon dioxide ($CO_2$) emissions), machine vision (e.g., implemented using a camera and computer imaging software), and/or device detection (e.g., implemented using beaconing or other wireless protocol). The sensor 514 may be used when altering functionality of a component, such as one or more of the components 512A through 512I. For example, sensing the temperature, pressure, and/or humidity in the physical space 500 may enable changing environmental conditions in the room, such as by controlling the HVAC system through the actuator 512D. In another example, sensing ambient light in the physical space 500 may enable changing lighting conditions in the room, such as by controlling the lighting system and/or the curtain system through another actuator like the actuator 512D. In another example, sensing $CO_2$ emissions in the physical space 500 may enable detecting one or more participants in the room, determining a number of the participants that are in the room, increasing the volume in the room through the speaker 512C, and/or changing environmental conditions in the room through the actuator 512D. In another example, sensing via machine vision in the physical space 500 may enable detecting one or more participants in the room and/or identifying the participants in the room. In another example, sensing via device detection in the physical space 500 may enable detecting a device that is brought into the room, such as the participant's personal computing device 512I, and/or changing the GUI of the video conferencing software that is displayed to the output interface 512F.

By way of example, the conference device 510 may execute the configuration software to detect one or both of the participants 505A and 505B. For example, the conference device 510 may detect one or both of the participants 505A and 505B by using facial recognition implemented by the camera 512A and computer imaging software (e.g., the machine vision), voice detection implemented by the microphone 512B and voice recognition software, beaconing from the participant's personal computing device 512I, IP address information or location information of the conference device 510 and/or the participant's personal computing device 512I, login information associated with the participants 505A and 505B using the conference device 510 and/or the participant's personal computing device 512I, and/or calendar information associated with the participants 505A and 505B. The detection may include identifying one or both of the participants 505A and 505B as particular persons, or persons belonging to a particular group, department or organization, and/or persons in particular geographic region. The conference device 510 may then execute the configuration software to determine one or more configurations specific to the participants 505A and 505B for altering the functionality of one or more of the components 512A through 512I that are available for use during the video conference. The configurations may be determined based on the preferences of the participants 505A and 505B and/or priorities associated with the functionality of one or more of the components 512A through 512I. As a result, the configurations may be specific to the participants 505A and 505B during the video conference.

Figure 6:
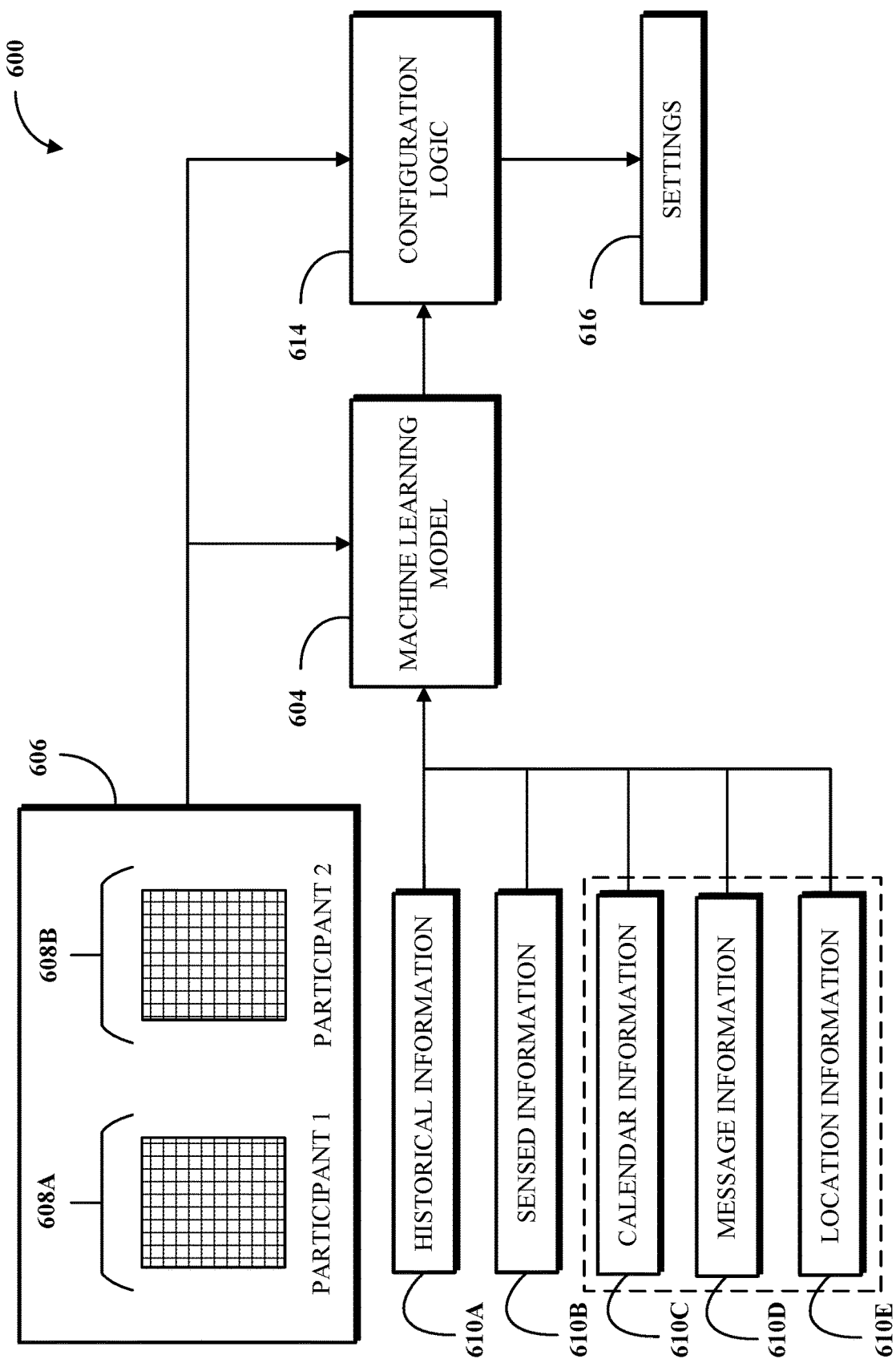
FIG. 6 is a block diagram of an example of a device executing configuration software to alter functionality of a component.

FIG. 6 is a block diagram of an example of a device (e.g., the conference device 410A, the conference device 410B, or the server device 420 shown in FIG. 4 or the conference device 510 shown in FIG. 5) executing configuration software (e.g., like the configuration software 440A, 440B or 44C shown in FIG. 4) to alter functionality of a component (e.g., like one of the components 412A through 412C or 414A through 414C shown in FIG. 4 or one of the components 512A through 512I shown in FIG. 5). The device may execute the configuration software to use a machine learning model 604 and/or records 606 (e.g., like the machine learning model and/or the records stored in the data structure 422). The machine learning model 604 may be used to predict preferences of a participant (e.g., Participants 1 and/or 2 using the conference device 410A, or Participant 3 using the conference device 410B), and/or priorities associated with functionality of the component for the participant. The prediction may be in response, for example, to detecting the participant. The records 606 (e.g., one or more lookup tables) may include predetermined preferences of a participant, and/or predetermined priorities associated with the functionality of the component for the participant, that may be applied based on detecting the participant. For example, the records 606 may include a first record 608A indicating Participant 1's preferences and/or priorities in connection with the component, and a second record 608B indicating Participant 2's preferences and/or priorities in connection with the component. Thus, in some cases, the preferences and/or priorities may be determined by using the machine learning model 604 to predict them, and in other cases, the preferences and/or priorities may be determined by accessing records to look them up.

By determining the preferences and/or priorities, the device may then execute the configuration software to determine a configuration (e.g., like one of the configurations 442A through 442C or 444A through 444C shown in FIG. 4) for the component. The configuration may implement one or more functionalities of the component that may be desired (e.g., a particular angle, focus, or zoom of the camera, gain or mute of a microphone, or volume of a speaker, or a particular feature of the video conferencing software being exposed via the GUI, such as a button). The device may then execute the configuration software to apply the configuration, such as by applying one or more settings 616 to the component (e.g., writing one or more parameters used by the component). For example, configuration logic 614 may receive input from the machine learning model 604 and/or the records 606, and may apply the one or more settings 616 to the component, based on the input, to apply the configurations during the video conference. For example, the configuration logic 614 may access an API exposed by the component to apply the one or more settings 616.

In some implementations, the machine learning model 604 may receive historical information 610A. For example, the historical information 610A could be stored in the data structure 422. The historical information 610A may include past settings applied to one or more components, which may be the same component or like the component that is being configured, during one or more past video conferences attended by the participant. In some implementations, the machine learning model 604 may be trained based on the historical information 610A, and may predict the preferences and/or priorities based on the historical information 610A. For example, the historical information 610A may include past settings made by a participant for a particular angle, focus, or zoom of a camera, gain or mute of a microphone, or volume of a speaker, or a particular feature of the video conferencing software being exposed via the GUI, such as recording the meeting, sharing a digital whiteboard, or communicating via chat. The machine learning model 604 may predict the preferences and/or priorities for the participant for controlling the camera, the microphone, the speaker, or the GUI, based on the past settings.

In some implementations, the machine learning model 604 may receive sensed information 610B. The sensed information 610B may include output from one or more sensors, such as the sensor 514 shown in FIG. 5. The sensed information 610B could be received, for example, before, during, and/or after a video conference. In some implementations, the machine learning model 604 may be trained based on the sensed information 610B, and may predict the preferences and/or priorities based on the sensed information 610B. For example, the sensed information 610B may include sensing a participant's personal computing device (e.g., a smart phone, laptop, or tablet, like the participant's personal computing device 512I) brought into the room (e.g., the physical space 500), and the machine learning model 604 may predict a preference and/or priority for screen sharing using the participant's personal computing device based on the sensing. In another example, the sensed information 610B may include sensing environmental conditions (e.g., temperature, pressure, humidity, ambient light, and/or $CO_2$ emissions), and the machine learning model 604 may predict a preference and/or priority for controlling an HVAC system based on the environmental conditions.

In some implementations, the machine learning model 604 may receive information from a software platform, such as a software platform implemented by the information system 430. The information may include, for example, calendar information 610C (e.g., stored in the data structure 432), message information 610D (e.g., stored in the data structure 434), and/or location information 610E (e.g., stored in the data structure 436). The calendar information 610C may include information relating to scheduled events for participants that are linked to a calendar, such as dates, times, titles, locations, equipment (e.g., like one of the components 412A through 412C or 414A through 414C shown in FIG. 4 or one of the components 512A through 512I shown in FIG. 5), and attendees associated with the events. The message information 610D may include information relating to messages communicated by participants, such as emails and chats, including dates, times, subjects, recipients, text content, and attachments associated with the messages. The location information 610E may include information relating to geolocations of participants and/or equipment, such as a particular geographic region of participants and/or equipment.

In some implementations, the machine learning model 604 may be trained based on the calendar information 610C, the message information 610D, and/or location information 610E, and may predict the preferences and/or priorities based on the calendar information 610C, the message information 610D, and/or location information 610E. For example, the calendar information 610C may indicate an scheduled event involving collaboration via a whiteboard (e.g., the term "whiteboard" being detected in a title of the meeting), and the machine learning model 604 may predict a preference and/or priority for displaying a button in a GUI during a video conference for sharing a digital whiteboard based on the scheduled event. In another example, the message information 610D may indicate multiple chat messages sent by a participant, and the machine learning model 604 may predict a preference and/or priority for displaying an area in a GUI during a video conference for communicating via chat based on the multiple chat messages. In another example, the location information 610E may indicate an overseas location of a participant, and the machine learning model 604 may predict a preference and/or priority for displaying subtitles (e.g., translations) in a preferred language in a GUI during a video conference based on the location. Thus, the machine learning model 604 may enable taking information from secondary inputs, such as a calendar service, a messaging service, or a location service, and propagating the information to customize a participant's experience during a video conference.

The device may execute the configuration software to train the machine learning model 604 based on one or more of the aforementioned sources of information. For example, the machine learning model 604 may be trained based on a combination of two or more of the records 606, the historical information 610A, the sensed information 610B, the calendar information 610C, the message information 610D, and the location information 610E.

FIG. 7 is an example of a prioritization matrix 700 for determining a configuration for altering functionality of a component. The prioritization matrix 700 could be stored, for example, in the data structure 422 shown in FIG. 4. A device (e.g., the conference device 410A, the conference device 410B, or the server device 420) may execute the configuration software to determine priorities of functionality of components. The priorities may indicate a relative ranking or importance of functionality of components to a particular person identified as the participant, or a particular group, department or organization to which the participant belongs, and/or a particular geographic region where the participant is located. For example, a priority may be determined based on a participant's use of a software platform, by settings applied by other users in the participant's group, department, or organization, or in the participant's particular geographic region, or a timing associated with the availability of features of the video conferencing software (e.g., a date of initial release or change).

The priorities may be expressed in various ways. For example, the priorities could be expressed as functions of components having scores, such as a low priority ("L"), a medium priority ("M"), or a high priority ("H"), as shown in FIG. 7. In other examples, the priorities could be expressed as numerical values, percentages, points, ranges, grades, or weights. In some implementations, the priorities may be assigned a default value (e.g., a medium priority), and one or more of the default value may be subsequently modified by user-specific prioritizations for a participant.

The device may execute the configuration software to access the prioritization matrix 700 when applying configurations for altering functionality of components. For example, for Participant 3 (e.g., using the conference device 410B), the priority may be high for communicating via chat (e.g., "H" for "Function 1"), and high for sharing a digital whiteboard (e.g., "H" for "Function 2"), but low for recording the meeting (e.g., "L" for "Function 3"). As a result, the device may then execute the configuration software to apply a first configuration that includes displaying an area in a GUI for communicating via chat, and displaying a button in the GUI for sharing a digital whiteboard, but not displaying a button in the GUI for recording the meeting (e.g., not initially shown in the GUI, but still available via menu options). Thus, the first configuration may expose functionality that is higher priority to Participant 3 (e.g., communicating via chat and sharing a digital whiteboard) while limiting functionality of lesser priority (e.g., recording the meeting).

Figure 8:
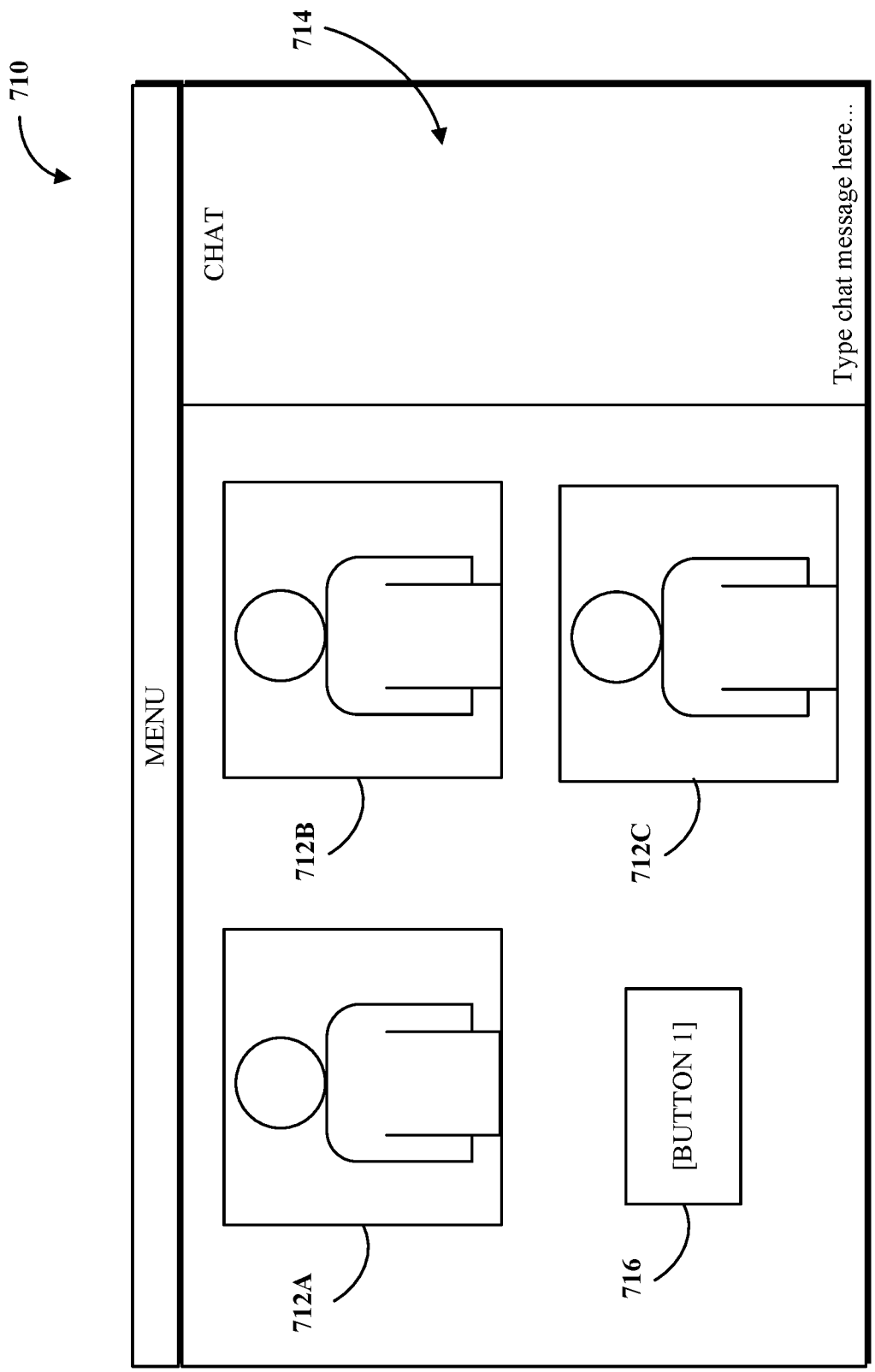
FIG. 8 is an illustration of an example of a graphical user interface (GUI) for customizing an experience during a video conference.

By way of example, with additional reference to FIG. 8, the first configuration may generate the graphical user interface, GUI 710. The GUI 710 could be output for display at an output interface like the user interface 212 shown in FIG. 2. For example, the GUI 720 might be displayed in connection with the conference device 410B shown in FIG. 4. The GUI 710 may include user tiles 712A, 712B, 712C corresponding to participants of the video conference (e.g., Participants 1, 2, and 3), a chat area 714 for communicating via chat, and a button 716 for sharing a digital whiteboard. The GUI 710 may implement an altered layout (e.g., altered from a default layout) to accommodate the second configuration, such as by placing the chat area 714 on the right of the GUI, and the button 716 on the lower left of the GUI. Thus, the first configuration may permit a customized experience for Participant 3 during a video conference via the GUI 710.

Referring back to FIG. 7, in some cases, multiple participants may be present, such as Participants 1 and 2 sharing a conference device in a same physical space (e.g., participants 505A and 505B in the physical space 500). In such cases, the device may then execute the configuration software to perform a comparative analysis that compares prioritizations of the different participants for the different functions. For example, for Participant 1, the priority may be high for communicating via chat (e.g., "H" for "Function 1"), high for sharing a digital whiteboard (e.g., "H" for "Function 2"), and high for increasing volume of a speaker (e.g., "H" for "Function 6"), but low for recording the meeting (e.g., "L" for "Function 3"), and low for zooming the camera (e.g., "L" for "Function 4"). For Participant 2, the priority may be medium for communicating via chat (e.g., "M" for "Function 1"), medium for sharing a digital whiteboard (e.g., "M" for "Function 2"), medium for zooming the camera (e.g., "M" for "Function 4"), and high for recording the meeting (e.g., "L" for "Function 3"), but low for increasing volume of the speaker (e.g., "L" for "Function 6"). Based on a comparative analysis weighted toward higher priority functions, the device may execute the configuration software to apply a second configuration that includes displaying an area in a GUI for communicating via chat, displaying a first button in the GUI for sharing a digital whiteboard, displaying a second button in the GUI for recording the meeting, and increasing volume of the speaker (e.g., the speaker 512C), but not zooming the camera (e.g., the camera 512A). Thus, the second configuration may expose functionality that is higher priority to a group of participants (e.g., Participants 1 and 2) while limiting functionality of lesser priority to the group of participants (e.g., zooming the camera).

Figure 9:
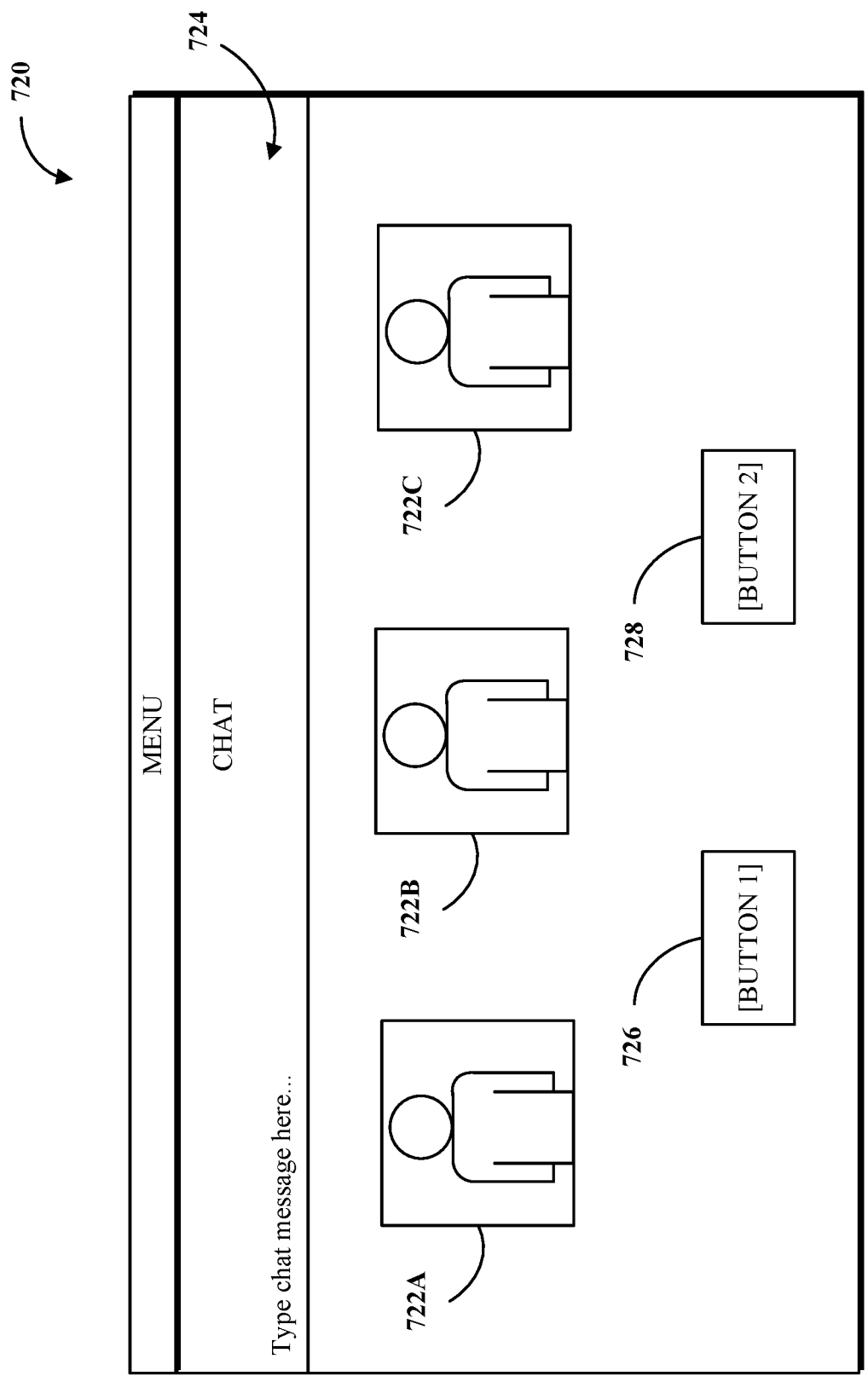
FIG. 9 is an illustration of another example of a GUI for customizing an experience during a video conference.

By way of example, with additional reference to FIG. 9, the second configuration may generate the GUI 720. The GUI 720 could be output for display at an output interface like the user interface 212 shown in FIG. 2. For example, the GUI 720 might be displayed in connection with the conference device 410A shown in FIG. 4. The GUI 720 may include user tiles 722A, 722B, 722C corresponding to participants of the video conference (e.g., Participants 1, 2, and 3), a chat area 724 for communicating via chat, a first button 726 for sharing a digital whiteboard, and a second button 728 for recording the meeting. The GUI 720 may implement an altered layout (e.g., altered from a default layout) to accommodate the second configuration, such as by placing the chat area 724 at the top of the GUI, the user tiles 722A through 722C in the middle of the GUI, the first button 726 on the lower left of the GUI, and the second button 728 on the lower right of the GUI. Thus, the second configuration may permit a second customized experience for Participants 1 and 2 during a video conference via the GUI 720 and the speaker.

In some cases, when multiple participants are detected, one participant may receive higher prioritizations (e.g., high priority) for functions than another participant. For example, the participant could be a host of the video conference, or a supervisor of the group, department, or organization holding the video conference, such as a manager, director, or teacher.

In some cases, when multiple participants are detected, one participant may receive higher prioritizations (e.g., high priority) for a first group of one or more functions, such as for exposing features via the GUI, but not for a second group of one or more functions, such as control of cameras, microphones, speakers, lights, and actuators, and/or may receive lower prioritizations (e.g., low priority) for one group of one or more functions but not for another. For example, the participant could be an administrative assistant, aide, or a support person that is assigned special duties to support the meeting.

In some cases, when multiple participants are detected, one or more of the participants may be unknown. In such cases, the prioritization matrix 700 may indicate default prioritizations for the unknown participant. For example, Participant 5 could be detected as an unknown participant of the video conference. Based on the unknown detection, default prioritizations (e.g., medium priority) may be indicated for functions (e.g., "M" for "Function 1" through "Function 8"). In some implementations, when a participant is detected as an unknown participant, a default configuration may be applied for the duration of the video conference while the unknown participant is present in the video conference.

Figure 10:
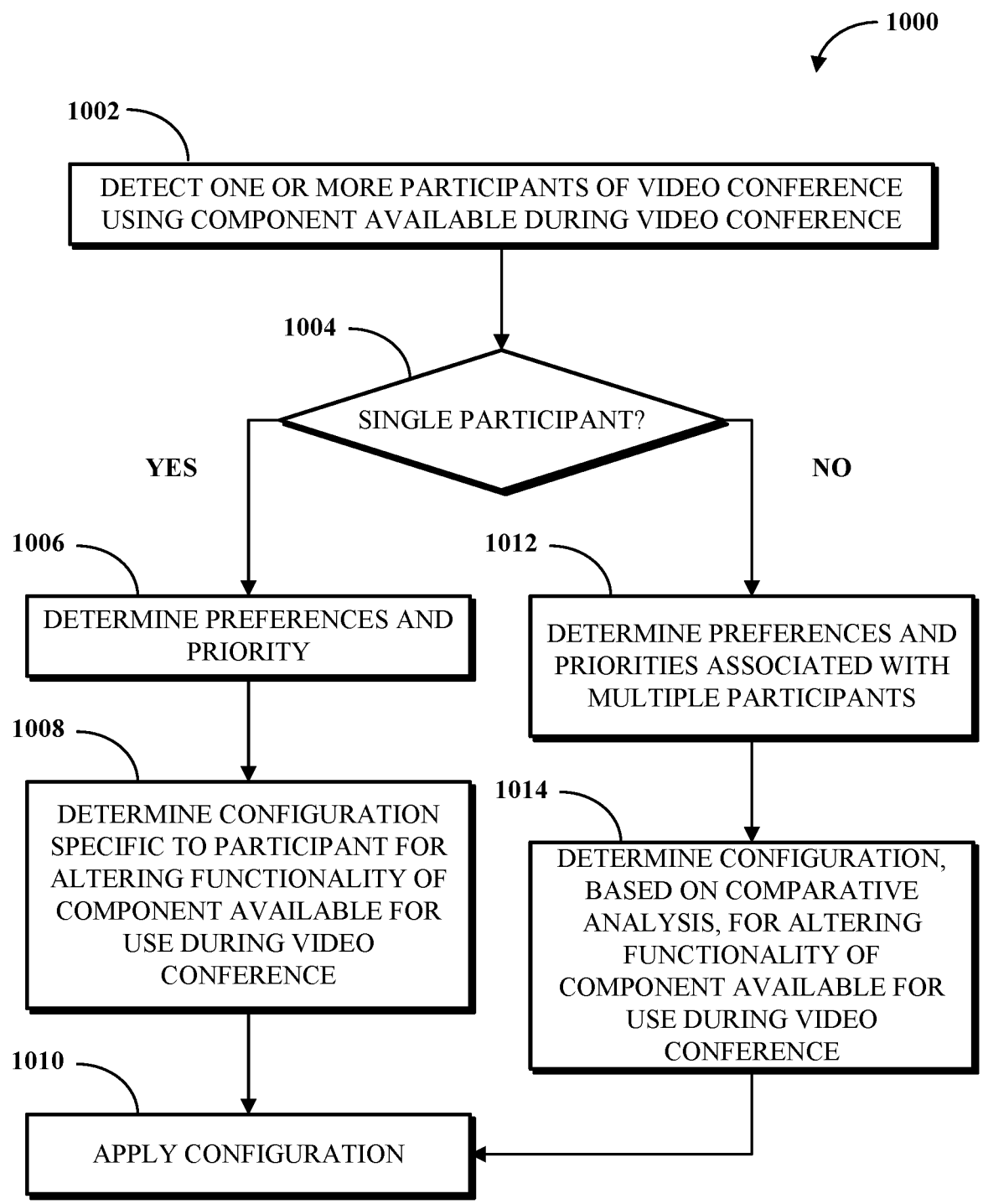
FIG. 10 is a flowchart of an example of a technique for applying a configuration for altering functionality of a component available for use during a video conference.

To further describe some implementations in greater detail, reference is next made to examples of techniques which may be performed by or using a system for applying a configuration for altering functionality of a component available for use during a video conference. FIG. 10 is a flowchart of an example of a technique 1000 for applying the configuration. The technique 1000 can be executed using computing devices, such as the systems, hardware, and software described with respect to FIGS. 1-9. The technique 1000 can be performed, for example, by executing a machine-readable program or other computer-executable instructions, such as routines, instructions, programs, or other code. The steps, or operations, of the technique 1000 or another technique, method, process, or algorithm described in connection with the implementations disclosed herein can be implemented directly in hardware, firmware, software executed by hardware, circuitry, or a combination thereof.

For simplicity of explanation, the technique 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1002, a device, such as the conference device 410A, the conference device 410B, or the server device 420 shown in FIG. 4, may execute configuration software to detect one or more participants of a video conference using a component that is available for use during the video conference. The component may be like one of the components 412A through 412C shown in FIG. 4 or one of the components 512A through 512 shown in FIG. 5. The device may execute the configuration software to detect the one or more participants, for example, by using facial recognition, voice detection, beaconing from a device used by the participant (e.g., the participant's personal computing device 512I), IP address information or location information of the device used by the participant, login information associated with the participant, or calendar information associated with the participant. The detection may include identifying one or more of the participants as a particular person, or a person belonging to a particular group, department or organization, and/or a person in particular geographic region (e.g., the device may execute the configuration software to determine identification information associated with the participant). For example, the device may execute the configuration software to identify the one or more participant based on the facial recognition, the voice detection, the beaconing, the login information, or the calendar information.

At 1004, the device may execute the configuration software to determine whether a single participant is detected using the component, or if multiple participants are detected. If a single participant is detected ("Yes"), at 1006, the device may then execute the configuration software to determine one or more preferences of the participant and a priority associated with functionality of the component. The one or more preferences and priority of the participant may be determined based on the identification information of the participant. In some cases, the one or more preferences and priority may be determined by accessing a record (e.g., a lookup table) that includes predetermined preferences and priorities of the participant. In some cases, the preferences and priorities may be determined by using a machine learning model, trained using past settings to configure one or more components during one or more past video conferences attended by the participant, to predict the one or more preferences and priority. The preferences could include, for example, a particular angle, focus, or zoom of the camera, gain or mute of the microphone, or volume of the speaker, or a particular feature of the video conferencing software being exposed via the GUI, such as recording the meeting, sharing a digital whiteboard, or communicating via chat. The priority may indicate, for example, a relative ranking or importance of the functionality for the participant, which may be indicated by the particular participant, or the participant's particular group, department or organization, and/or the participant's particular geographic region.

At 1008, the device may then execute the configuration software to determine a configuration specific to the participant for altering functionality of the component available for use during the video conference. The configuration may be determined based on the one or more preferences of the participant and the priority associated with the functionality of the component. In some implementations, the configuration may be determined by referencing a prioritization matrix including priorities related to functions of the component.

At 1010, the device may then execute the configuration software to apply the configuration during the video conference. The configuration may be applied based on the one or more preferences and the priority. The configuration may be applied by applying settings to the component. For example, the settings may control a particular angle, focus, or zoom of a camera, gain or mute of a microphone, or volume of a speaker, or a particular feature of video conferencing software being exposed via a GUI (e.g., a button), such as recording the meeting, sharing a digital whiteboard, or communicating via chat.

Returning to 1004, if a single participant is not detected ("No"), but rather multiple participants are detected, at 1012, the device may then execute the configuration software to determine preferences and priorities of the multiple participants. The preferences and priorities may be determined based on identification information of one or more of the multiple participants. In some cases, the preferences and priorities may be determined by accessing a record (e.g., a lookup table) that includes predetermined preferences and priorities of one or more of the multiple participants. In some cases, the preferences and priorities may be determined by using a machine learning model, trained using past settings to configure the one or more components during one or more past video conferences attended by one or more of the multiple participants, to predict the preferences and priorities. The priorities of the multiple participants may be determined by accessing a prioritization matrix. The device may then execute the configuration software to perform a comparative analysis that compares prioritizations of the multiple participants for different functions to determine priorities for the multiple participants as a group.

At 1014, the device may then execute the configuration software to determine a configuration, specific to the multiple participants as a group, for altering functionality of the component during the video conference. The configuration may be determined based on the comparative analysis. The device may then execute the configuration software to return to 1010 where the configuration may be applied during the video conference by applying settings to the component.

Some implementations may include a method that includes detecting a participant of a video conference; determining one or more configurations specific to the participant for altering functionality of one or more components available for use during the video conference, wherein the one or more configurations are determined based on one or more preferences of the participant and a priority associated with the functionality; and applying the one or more configurations during the video conference. In some implementations, the participant may be detected by at least one of facial recognition, voice detection, beaconing from a device associated with the participant, login information associated with the participant, location information, or calendar information. In some implementations, the method may include identifying the participant as at least one of a particular person, a person belonging to a particular group, or a person in a particular geographic region. In some implementations, the one or more components may include at least one of a camera, a microphone, a speaker, or a GUI for display at an output interface, and altering the functionality alters at least one of an angle of the camera, a gain of the microphone, a volume of the speaker, or a configuration of the GUI. In some implementations, the method may include using a machine learning model, trained using past settings applied to the one or more components during one or more past video conferences attended by the participant, to predict the one or more preferences, wherein applying the one or more configurations includes applying one or more settings to the one or more components based on the one or more preferences. In some implementations, the method may include accessing a record associated with the participant to determine the one or more preferences, wherein applying the one or more configurations includes applying one or more settings to the one or more components based on the one or more preferences. In some implementations, the method may include detecting a second participant of the video conference; determining one or more preferences of the second participant for configuring the one or more components, wherein the one or more preferences of the second participant are determined based on identification information associated with the second participant; and comparing the one or more preferences of the participant to the one or more preferences of the second participant. In some implementations, the method may include detecting a device associated with the participant during the video conference, wherein the one or more configurations include configuring the one or more components for use with the device.

Some implementations may include an apparatus that includes a memory; and a processor configured to execute instructions stored in the memory to: detect a participant of a video conference; determine one or more configurations specific to the participant for altering functionality of one or more components available for use during the video conference, wherein the one or more configurations are determined based on one or more preferences of the participant and a priority associated with the functionality; and apply the one or more configurations during the video conference. In some implementations, the processor may be further configured to execute instructions stored in the memory to use a machine learning model, trained using calendar information associated with the participant, the calendar information including scheduled events, to predict the one or more preferences. In some implementations, the processor may be further configured to execute instructions stored in the memory to use a machine learning model, trained using message information associated with the participant, the message information including at least one of chats or emails, to predict the one or more preferences. In some implementations, the processor may be further configured to execute instructions stored in the memory to use a machine learning model, trained using location information associated with the participant, the location information including a geolocation of at least one of the participant or the one or more components, to predict the one or more preferences. In some implementations, the processor may be further configured to execute instructions stored in the memory to detect a device associated with the participant that is in a physical space during the video conference. In some implementations, the one or more components may include an actuator, and altering the functionality may alter an environmental condition in a physical space. In some implementations, the apparatus may include a sensor, the one or more configurations are further determined based on an output from the sensor.

Some implementations may include a non-transitory computer readable medium that stores instructions operable to cause one or more processors to perform operations that include detecting a participant of a video conference; determining one or more configurations specific to the participant for altering functionality of one or more components available for use during the video conference, wherein the one or more configurations are determined based on one or more preferences of the participant and a priority associated with the functionality; and applying the one or more configurations during the video conference. In some implementations, the operations may further include using a machine learning model, trained using sensed information including environmental conditions in a physical space, to predict the one or more preferences. In some implementations, detecting the participant may include identifying the participant as at least one of a particular person, a person belonging to a particular group, or a person in a particular geographic region. In some implementations, detecting the participant may include identifying the participant as unknown and assigning a default for the priority based on the identification. In some implementations, the operations may further include accessing a prioritization matrix to determine the priority.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   determining one or more configurations specific to a first participant of a video conference for altering functionality of one or more components of the video conference;
   applying the one or more configurations during the video conference;
   determining one or more preferences of a second participant of the video conference associated with the one or more components; and
   determining at least one additional configuration of the video conference based on at least one of one or more prioritizations of the first participant or one or more prioritizations of the second participant, wherein determining the at least one additional configuration comprises comparing the one or more prioritizations of the first participant and the one or more prioritizations of the second participant, and wherein the comparing is weighted toward one or more higher priority functions of the one or more components.

2. The method of claim 1, wherein the first participant is detected by at least one of facial recognition, voice detection, beaconing from a device associated with the first participant, login information associated with the first participant, location information, or calendar information.

3. The method of claim 1, further comprising:
   identifying the first participant as at least one of a particular person, a person belonging to a particular group, or a person in a particular geographic region.

4. The method of claim 1, wherein the one or more components include at least one of a camera, a microphone, a speaker, or a graphical user interface for display at an output interface, and altering the functionality alters at least one of an angle of the camera, a gain of the microphone, a volume of the speaker, or a configuration of the graphical user interface.

5. The method of claim 1, further comprising:
using a machine learning model, trained using past settings applied to the one or more components during one or more past video conferences attended by the first participant, to predict the one or more preferences, wherein applying the one or more configurations includes applying one or more settings to the one or more components based on the one or more preferences.

6. The method of claim 1, further comprising:
accessing a record associated with the first participant to determine the one or more preferences, wherein applying the one or more configurations includes applying one or more settings to the one or more components based on the one or more preferences.

7. The method of claim 1, further comprising:
detecting a device associated with the first participant during the video conference, wherein the one or more configurations include configuring the one or more components for use with the device.

8. One or more non-transitory computer readable media storing instructions operable to cause one or more processors to perform operations comprising:
determining one or more configurations specific to a first participant of a video conference for altering functionality of one or more components of the video conference;
applying the one or more configurations during the video conference;
determining one or more preferences of a second participant of the video conference associated with the one or more components; and
determining at least one additional configuration of the video conference based on at least one of one or more prioritizations of the first participant or one or more prioritizations of the second participant, wherein determining the at least one additional configuration comprises comparing the one or more prioritizations of the first participant and the one or more prioritizations of the second participant, and wherein the comparing is weighted toward one or more higher priority functions of the one or more components.

9. The one or more non-transitory computer readable media of claim 8, wherein the first participant is detected by at least one of facial recognition, voice detection, login information associated with the first participant, location information, or calendar information.

10. The one or more non-transitory computer readable media of claim 8, the operations further comprising:
identifying the first participant as at least one of a particular person or a person belonging to a particular group.

11. The one or more non-transitory computer readable media of claim 8, wherein the one or more components include at least one of a camera, a microphone, a speaker, or a graphical user interface for display at an output interface, and altering the functionality alters at least one of an angle of the camera, a volume of the speaker, or a configuration of the graphical user interface.

12. The one or more non-transitory computer readable media of claim 8, the operations further comprising:
using a machine learning model, trained using past settings applied to the one or more components during one or more past video conferences attended by the first participant, to predict the one or more preferences, wherein applying the one or more configurations includes applying one or more settings to the one or more components based on the one or more preferences.

13. The one or more non-transitory computer readable media of claim 8, the operations further comprising:
accessing a record associated with the first participant to determine the one or more preferences, wherein applying the one or more configurations includes applying one or more settings to the one or more components.

14. The one or more non-transitory computer readable media of claim 8, the operations further comprising:
detecting a device associated with the first participant during the video conference, wherein the one or more configurations include a configuration of the one or more components for use with the device.

15. A system comprising:
memory hardware; and
one or more processors configured to execute instructions stored in the memory hardware to:
determine one or more configurations specific to a first participant of a video conference for altering functionality of one or more components of the video conference;
apply the one or more configurations during the video conference;
determine one or more preferences of a second participant of the video conference associated with the one or more components; and
determine at least one additional configuration of the video conference based on at least one of one or more prioritizations of the first participant or one or more prioritizations of the second participant, wherein determining the at least one additional configuration comprises comparing the one or more prioritizations of the first participant and the one or more prioritizations of the second participant, and wherein the comparing is weighted toward one or more higher priority functions of the one or more components.

16. The system of claim 15, wherein the one or more components include at least one of a camera, a microphone, a speaker, or a graphical user interface for display at an output interface, and altering the functionality alters at least one of an angle of the camera, a gain of the microphone, or a volume of the speaker.

17. The system of claim 15, wherein the first participant is detected by at least one of facial recognition, voice detection, beaconing from a device associated with the first participant, login information associated with the first participant, location information, or calendar information.

18. The system of claim 15, the one or more processors configured to execute instructions stored in the memory hardware to:
identify the first participant as at least one of a particular person, a person belonging to a particular group, or a person in a particular geographic region.

19. The system of claim 15, the one or more processors configured to execute instructions stored in the memory hardware to:
use a machine learning model, trained using past settings applied to the one or more components during one or more past video conferences attended by the first participant, to predict the one or more preferences, wherein applying the one or more configurations includes applying one or more settings to the one or more components based on the one or more preferences.

20. The system of claim 15, the one or more processors configured to execute instructions stored in the memory hardware to:
  accessing a record associated with the first participant to determine the one or more preferences, wherein applying the one or more configurations includes applying one or more settings to the one or more components based on the one or more preferences.

\* \* \* \* \*